Patented June 26, 1945

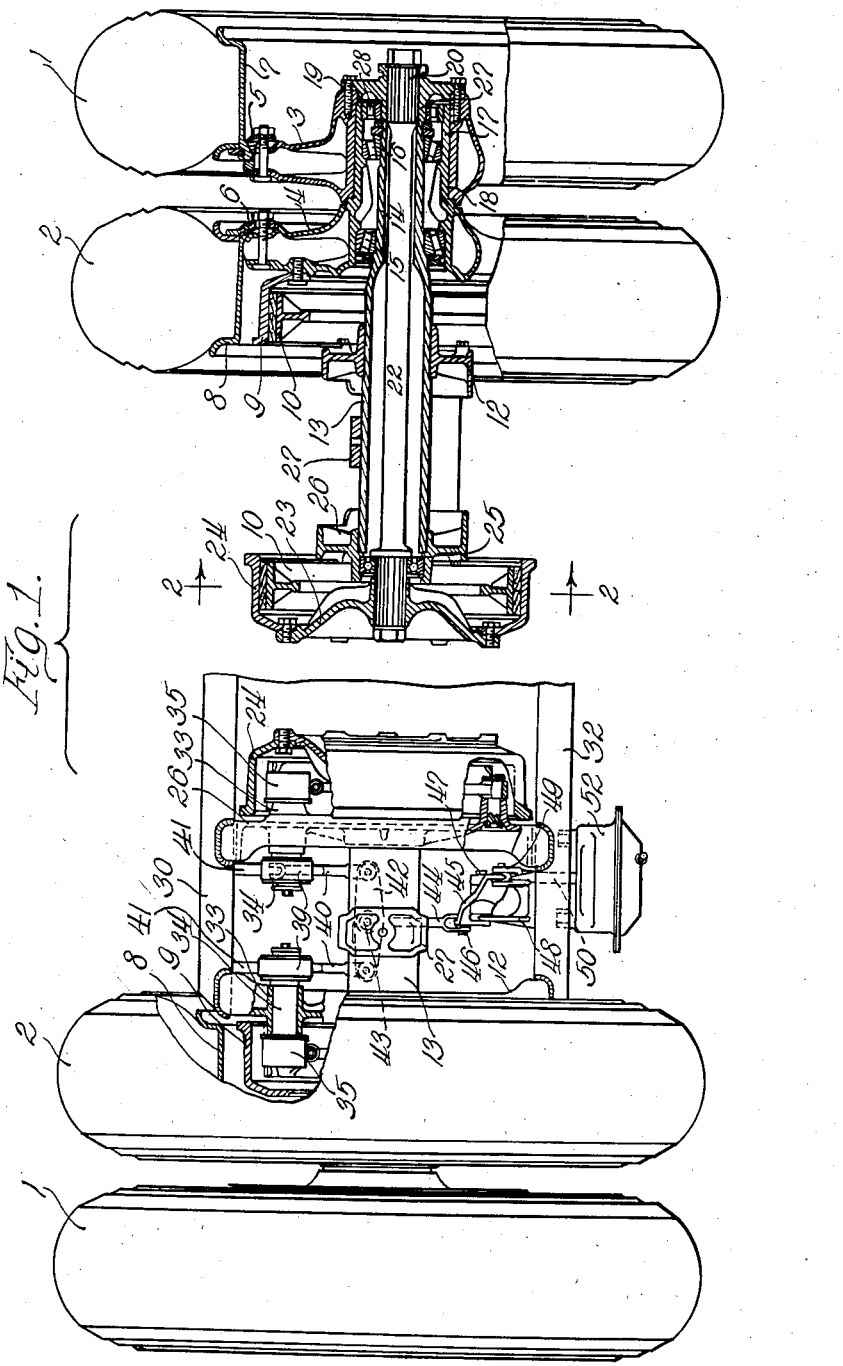

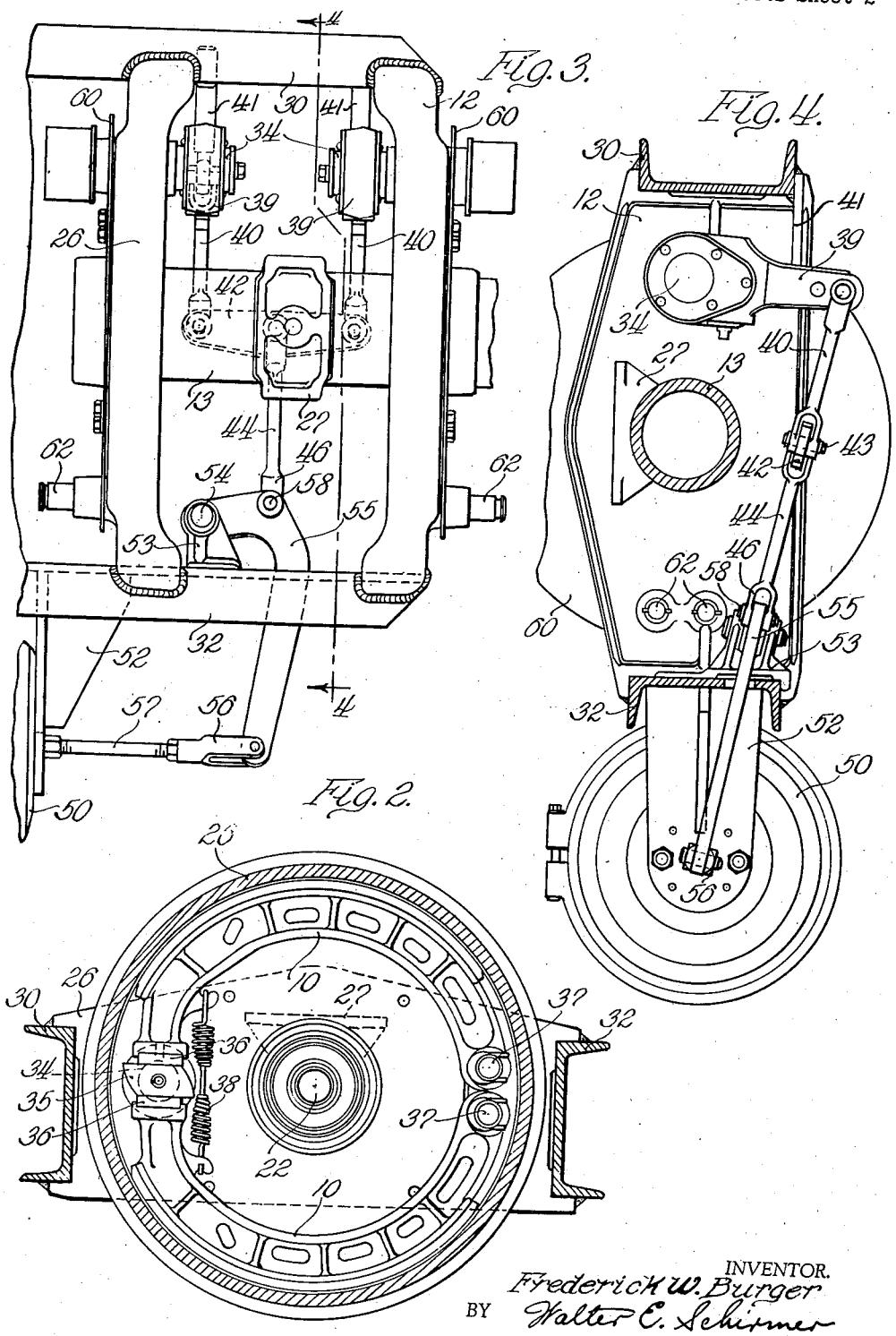

2,379,276

UNITED STATES PATENT OFFICE 2,379,276

BRAKE MECHANISM

Frederick W. Burger, Niles, Mich., assignor to Clark Equipment Company, Buchanan, Mich., a corporation of Michigan Application December 9, 1942, Serial No. 468,434

5 Claims. (Cl. 188—18)

This invention relates to brake mechanisms, and more particularly is directed to a brake-applying mechanism for use in connection with a dual wheel construction for trailer axles such as shown in Mills Patent No. 2,266,061, issued December 16, 1941.

In such dual wheel trailer axles where the two wheels on each side of the vehicle are mounted for independent relative rotation to prevent tire scuffing and the like and are each provided with separate brake mechanisms, I have found that it is exceedingly difficult to provide brakes which will be actuated equally when it is desired to stop the rotation of the wheels. It is practically impossible to adjust the brake initially so that there will be even wear thereon, and if this is not provided, then, obviously, one brake will take a much greater load than the other brake and result in undue wear, as well as prevent proper distribution of the braking force between the two brakes.

It is therefore a primary object of the present invention to provide a construction in which, regardess of the setting of the brake mechanisms, i. e., within a given range, application of the brake energizing force will be transmitted equally to both of the brakes to provide uniform braking action on each of the wheels. This is accomplished by providing an equalizing member which is connected to the two brake actuating shafts carrying the cams that spread the respective brake shoes, and in turn is actuated from a suitable brake energizing means, such as a vacuum cylinder or an air cylinder.

The present construction is especially desirable since it allows the use of a standard construction for the brake equalizing mechanism up to the point to which the actuating member is connected to the equalizer. This allows the same construction to be used for either vacuum operation or air pressure operation up to this point, thus facilitating manufacture and reducing costs.

Another important feature of the present invention is the provision of means operable to hold the brake operating shaft from rotating beyond a predetermined limit toward brake releasing position. By reason of this mechanism it is possible to hold one of the brake shafts in position while the other brake shaft is being adjusted to accommodate undue wear or uneven wear on the associated brake lining. With the equalizing mechanism employed in the present invention I have found that accurate and positive adjustment cannot be made unless means is provided for holding the brake shafts against moving beyond a predetermined released position.

Another feature of the present invention is the simplicity of design and the accessibility of the mechanism for inspection or repair.

Other objects and advantages of the present invention will appear more fully from the following detailed description, which, taken in conjunction with the accompanying drawings, will disclose to those skilled in the art the particular construction and operation of the preferred form of the present invention.

In the drawings:

Figure 1 is a plan view partly in section of a trailer axle embodying the present invention;

Figure 2 is a sectional view taken substantially on line 2—2 of Figure 1 showing details of the brake mechanism;

Figure 3 is a top plan view of a modified form of construction adapted for vacuum brake operation; and Figure 4 is a sectional view taken substantially on line 4—4 of Figure 3.

Referring now in detail to the drawings, in Figure 1 I have disclosed a dual wheeled trailer axle assembly comprising the wheels 1 and 2 disposed on each side of the vehicle. These wheels include cast metal wheel spiders 3 and 4, respectively, which have hollow radially extending spokes provided with suitable clamping lugs 5 and 6, respectively, for clamping the rims 7 and 8, respectively, to the spoke ends of the wheel spiders. The wheel spider 4 is adapted to carry a brake drum 9 which is bolted thereto, and which has cooperating therewith the brake shoes 10 carried on a suitable brake supporting bracket 12 rigidly mounted on the tubular axle spindle or sleeve 13. The spindle 13 is reduced adjacent its outer end, as indicated at 14, to provide wheel bearing seats for the tapered roller bearings 15 and 16. The wheel spider 4 is provided with an extending hub section 17 upon which is mounted the hub portion of the spider 3, there being a suitable bushing 18 provided which acts as a lubricant stop and also, to a small degree, as a bearing support of the wheel spider upon the hub extension 17.

The spider 3 is connected about its outer hub surface to the flange 19 splined upon the end 20 of an axle shaft 22 extending through the spindle and carrying at its opposite end the spider 23 supporting a second brake drum 24. The shaft 22 adjacent the spider 23 is supported in a suitable bearing 25 carried by the bracket member 26 rigidly secured to the end of the spindle. A suitable spring pad 27 is rigidly secured to the spindle 13 intermediate the brackets 12 and 26.

The flange 19 to which the spider 3 is non-rotatably secured is provided with a flanged portion 27 adapted to form a support for the inner race of a bearing assembly 28, the outer race of which is secured in the end of the hub extension 17. With this construction the load on the wheel which is transmitted through the flange 19 to the bearing 28 and thence to the hub extension 17. The load from the wheel 2 is transmitted directly to the bearing 15, while the load from the bearing 28 is transmitted through the hub extension to the bearing 16, thus providing a division of the load substantially equally between the bearings 15 and 16.

The details of this bearing arrangement are being described and claimed in a copending application of Burton L. Mills, Serial No. 480,715, filed March 26, 1943, Patent No. 2,356,942, August 29, 1944.

Considering now the left hand side of Figure 1, which discloses the details of the brake mounting, it will be noted that the brackets 12 and 26 have their ends welded to suitable cross members 30 and 32, which cross members extend in parallel arrangement to the opposing brackets 12 and 26. The brackets 12 and 26 are provided with collar portions 33 through which extend the brake operating shafts 34, these shafts 34 carrying at their inner ends cams 35, which, as shown in Figure 2, extend between the adjacent ends 36 of the brake shoes 10 for spreading the brake shoes outwardly about their pivots 37 to bear against the internal surface of the brake drums 9 and 24. A suitable spring 38 normally tends to collapse the brake drums.

Each of the shafts 34 is provided with an outwardly splined end on which is mounted the arms or cranks 39, these arms or cranks having an extending portion to which are secured the rods 40, whereby, upon pulling the rods 40, the arms or cranks 39 are rotated to produce rotation of the shaft for actuating the brakes. The two rods 40 have their free ends connected to opposite ends of an equalizer member 42 by means of clevises or the like forming a pivotal connection. The equalizer member 42 in turn has pivotally connected at its center as indicated at 43, a link 44 which, at its opposite end is connected to the lower end of a lever 45, as by means of the clevis 46. The lever 45 is mounted for rotation intermediate its ends about the shaft 47 carried by the bracket 48 secured to the inner surface of the cross arm 32, and at its upper end has connected thereto a clevis 49 which is connected to the operating rod 50 of a diaphragm member 52 actuated by air pressure. Thus, in the operation of this construction, the operator of the vehicle, when he desires to operate the brakes, opens the air pressure valve which introduces air under pressure into the chamber 52. This forces the actuating arm 50 outwardly of the chamber or toward the spindle 13, as viewed in Figure 1, rotating lever 45 about its pivot and thereby producing opposite motion of the link 44. This results in the link 44 moving toward the cross arm 32, thereby moving the equalizer bar 42 therewith and applying a pull on each of the arms 40 connected to the brake actuating shafts.

The equalizer bar 42 insures that an equal amount of pull will be imparted to each of the arms 40 regardless of the setting of the brakes, and will apply an equal braking pressure to each of the brake mechanisms for the respective wheels 1 and 2. As a result, these brakes will be applied with equal force so that uniform wear is produced by the braking action on the tires.

In order to accommodate adjustment of the brakes when one of the brake linings wears faster than the other, I provide stops 41, shown in Figures 1, 3 and 4, which are adapted to abut against the crank arms 39 carried on the ends of the brake shafts 34. The abutments 41 hold the arms 39 from rotating toward brake released position, and consequently will hold either of the arms in a limiting position while the brake adjustor mechanism embodied in the crank arm to the shaft 34 is operated to draw the other shaft into position so that the cams 35 will take up any unequal wear of the brake linings.

In the absence of such stops it would not be possible to restore the equalizer bar 42 to a position parallel the axis of shafts 34, since tightening of one of the slack adjustors would allow the crank arm to rotate rearwardly, destroying alinement and preventing brake equalization and proper adjustment. These stops 41 comprise bars welded or otherwise secured to the cross member 30 and extending into a position so as to prevent the crank arms from rotating beyond the position shown in Figure 4. This allows proper adjustment of the brake linings through the slack adjustor mechanism, the brake operating shaft of the unadjusted brake being held against reverse rotation while the proper amount of slack is taken up in the other crank arm.

In the embodiment of the invention shown in Figures 3 and 4, a modified type of construction is provided for use in conjunction with a vacuum brake operating mechanism. Similar parts in this form of the invention are indicated by corresponding reference numerals.

In this form of the invention, as exemplified in Figure 3, which is a bottom plan view of the construction, the vacuum brake cylinder is indicated diagrammatically at 50 and is supported from one of the channel members, such as the cross member 32 by means of a bracket 52 which may be welded or otherwise secured to this member. Mounted on the inner face of the cross arm 32 is a second bracket 53, which includes a pivot 54 for pivoting the bell crank member 55. The bell crank member 55 is set at an angle to a horizontal plane through the structure, and at its one end is connected by means of the clevis 56 to the actuating arm 57 of the vacuum cylinder. Intermediate its ends the lever 55 is provided with a pivot connection 58 to which the clevis end 46 of the arm 44 is connected. At its opposite end the arm 44 is connected to the equalizer member 42, which in turn is connected to the arms 40 connected to the cranks 39 of the operating shafts 34 for the brake mechanism. It will be noted that the brackets 12 and 26 carry backing plate members 60 forming closures for the brake assembly, and also carry the stud supports 62 upon which are mounted the pivoted ends of the brake shoes 10.

It will be seen that with this construction, the brake operating mechanism is identical with that described in Figures 1 and 2, with the exception of the substitution of a bell crank lever 55 in place of the lever 45, which is pivoted intermediate its ends. This is due to the fact that in a vacuum brake mechanism the pull is in the same direction as the motion required to rotate the operating shafts, whereas in an air pressure system this motion must be reversed.

It is therefore believed apparent that I have provided in conjunction with an independent dual wheel mounting for trailer axles, a brake actuating mechanism of unique and simple design which will always insure equalized pressure on the brakes, and which can be employed either with vacuum or pressure braking actuators with very little change, the majority of the parts being identical in either type of operation.

I do not intend to be limited to the specific details herein shown and described, but only insofar as defined by the scope and spirit of the appended claims.

I claim:

1. In combination, a pair of parallel laterally spaced brake mechanisms including brake supporting means, cross members rigidly interconnecting said supporting means, a brake actuator mounted on one of said cross members, a lever actuated thereby and pivotally mounted on said cross member, operating shafts for said brake mechanisms, means interconnecting said operating shafts and said lever including an equalizer member for actuating said shafts in one direction, and stop means carried by the other cross member for preventing movement of said shafts in the opposite direction beyond a predetermined point.

2. In combination, in a trailer axle, a pair of dual independently mounted wheels at each side of the axle, a brake actuating mechanism for each of the wheels on each side of the axle comprising parallel laterally spaced web members, brake mechanism supported on said webs including axially alined operating shafts extending toward each other between said webs, cross members rigidly interconnecting adjacent ends of said webs, a brake actuator mounted on the outer face of one of said cross members, a lever pivotally mounted on the inner face of said one cross member and connected at one end to said actuator, brake shaft actuating means between said shafts and levers including equalizing means for transmitting equal braking action to each of said shafts and crank arms on said shafts connected to said equalizing means, and projections on the other of said cross members engaging said arms to limit their rotation in brake releasing direction.

3. In combination, in a trailer axle construction including a pair of independently rotatable wheels at each side of said axle, laterally spaced individual brake drums for each wheel of each pair of wheels, and brake actuating mechanism comprising parallel laterally spaced web members disposed between each set of drums, brake mechanism supported on said webs for engaging said drums, axially alined operating shafts for said brake mechanism extending toward each other between said webs, a brake actuator, and linkage between said actuator and said shafts including an equalizer for transmitting equal braking action to each of said shafts.

4. The combination of claim 3 including cross members rigidly interconnecting the ends of said web members, and means carried by one of said cross members for limiting rotation of said shafts in brake-releasing direction.

5. The combination of claim 3 including cross members rigidly interconnecting the ends of said web members, said actuator being rigidly mounted on one of said cross members and said linkage including a lever pivotally mounted on the inner face of said cross member and interconnecting said actuator and equalizer.

FREDERICK W. BURGER.